Aug. 19, 1952     G. F. BELLAIRS ET AL     2,607,853
TELECOMMUNICATION SYSTEM
Filed Jan. 24, 1948     7 Sheets-Sheet 7
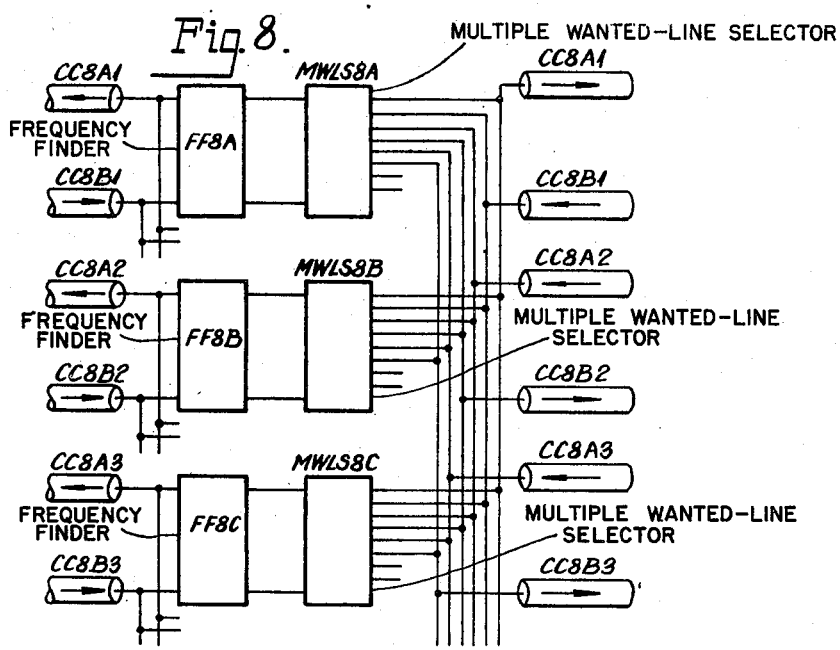
Fig. 8.
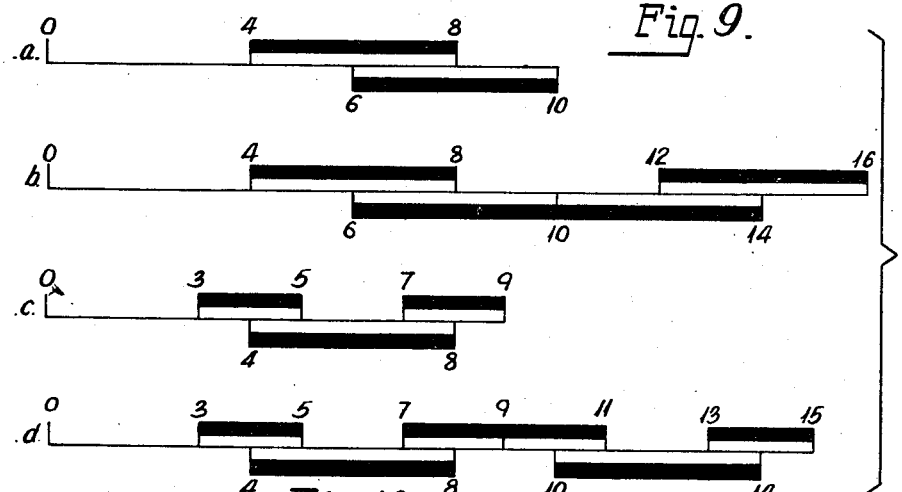
Fig. 9.
Fig. 10.
| DIGIT | 1 | 2 | 3 | 4 | 5 | 6 | 7 | 8 | 9 | 0 |
|---|---|---|---|---|---|---|---|---|---|---|
| UNITS | 1632 | 1624 | 1616 | 1608 | 1600 | 1592 | 1584 | 1576 | 1568 | 1560 |
| TENS | 16320 | 16240 | 16160 | 16080 | 16000 | 15920 | 15840 | 15760 | 15680 | 15600 |
| HUNDREDS | 24000 | 24800 | 25600 | 26400 | 27200 | 28000 | 28800 | 29600 | 30400 | 31200 |
Inventors
Guy Harington Bellairs
John Charles Ireland
by Dezsö Steinberg
Attorney Patented Aug. 19, 1952

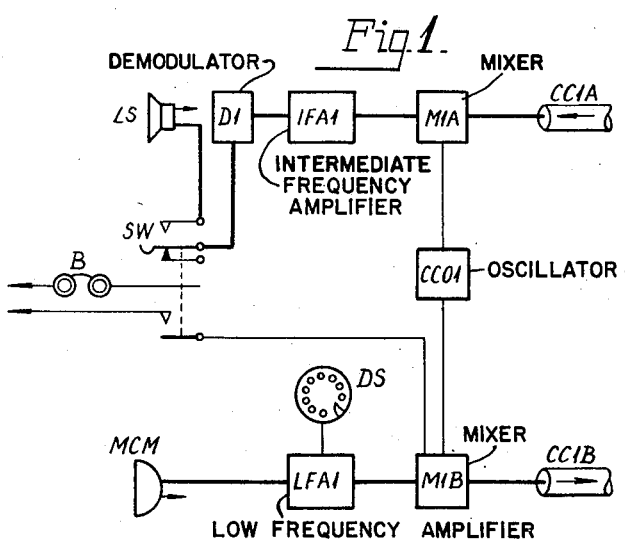
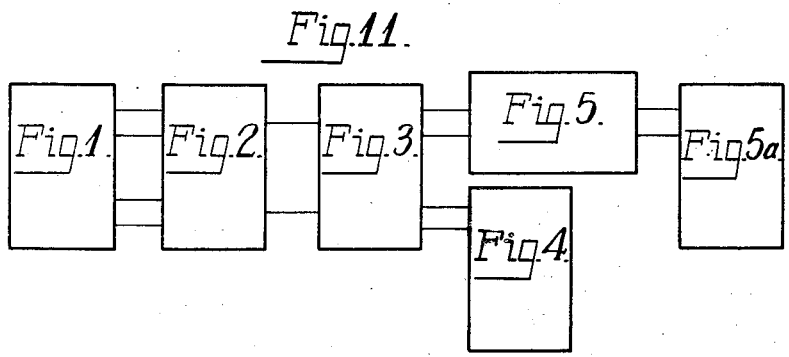

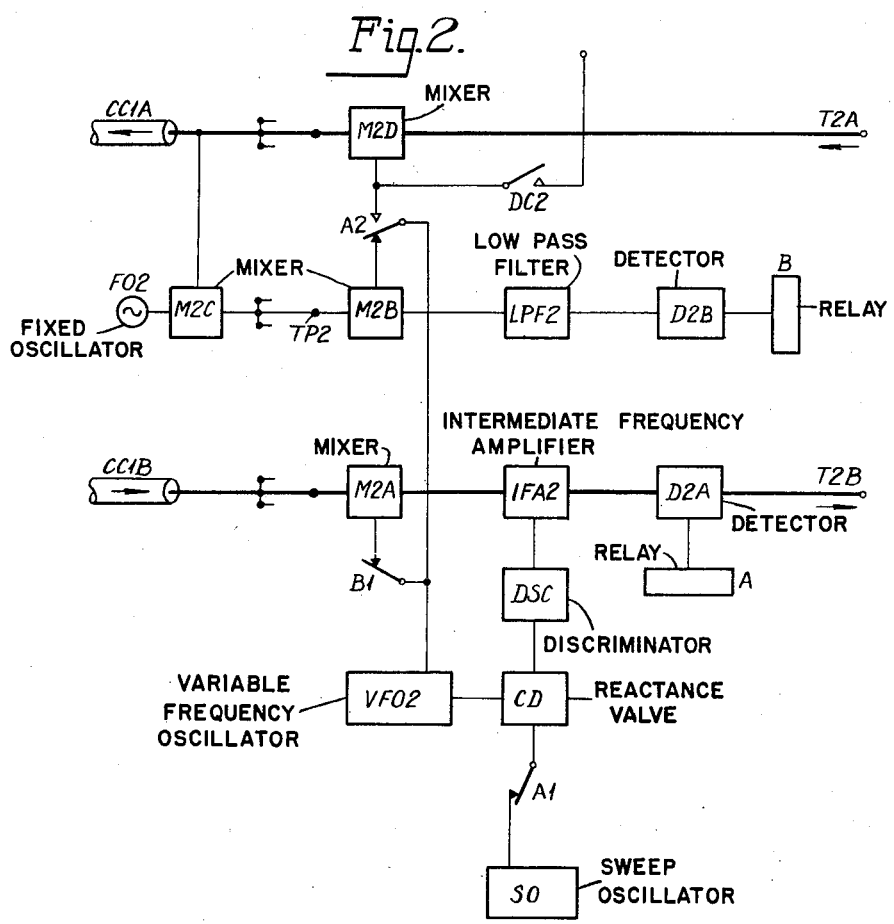

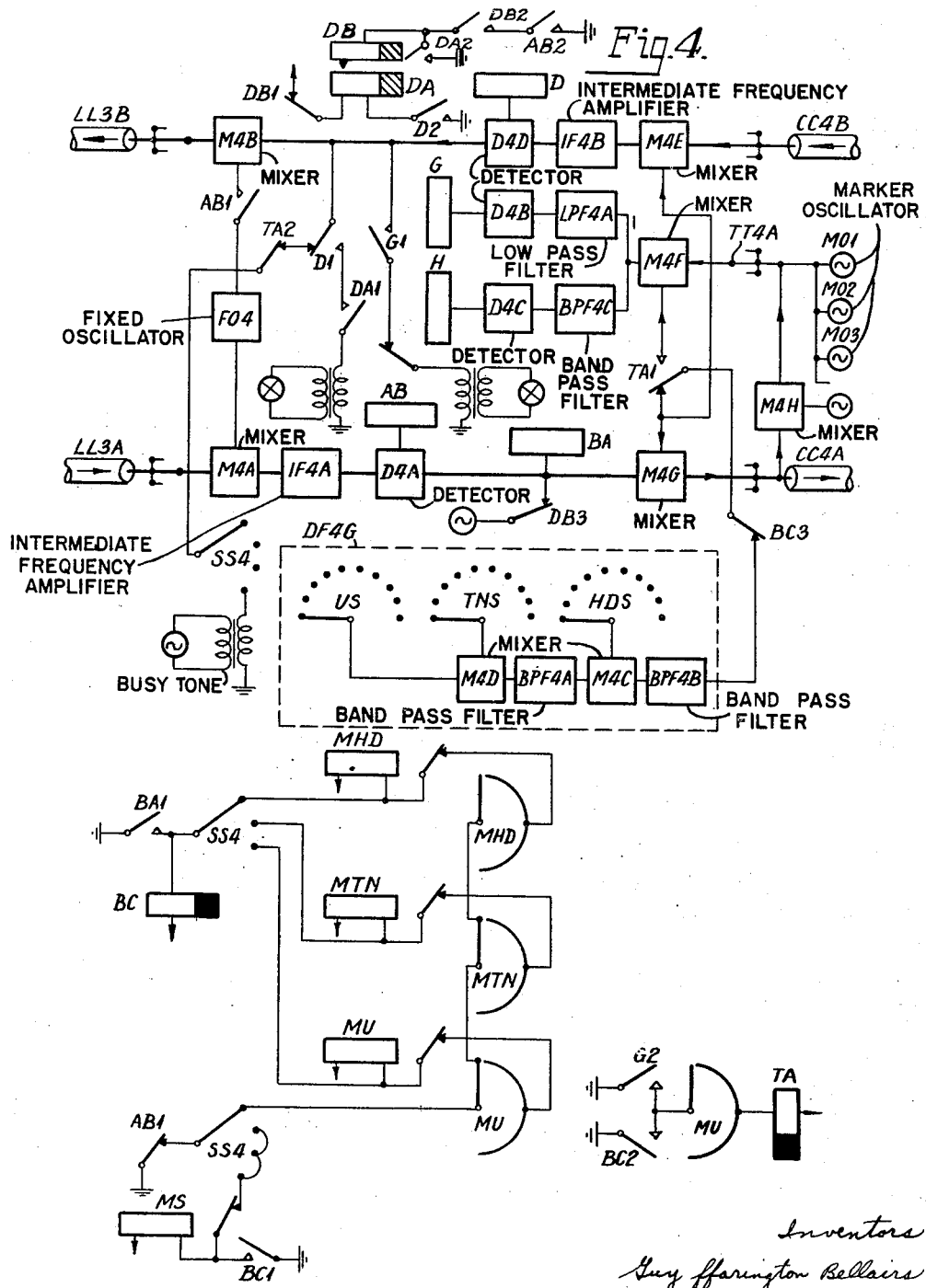

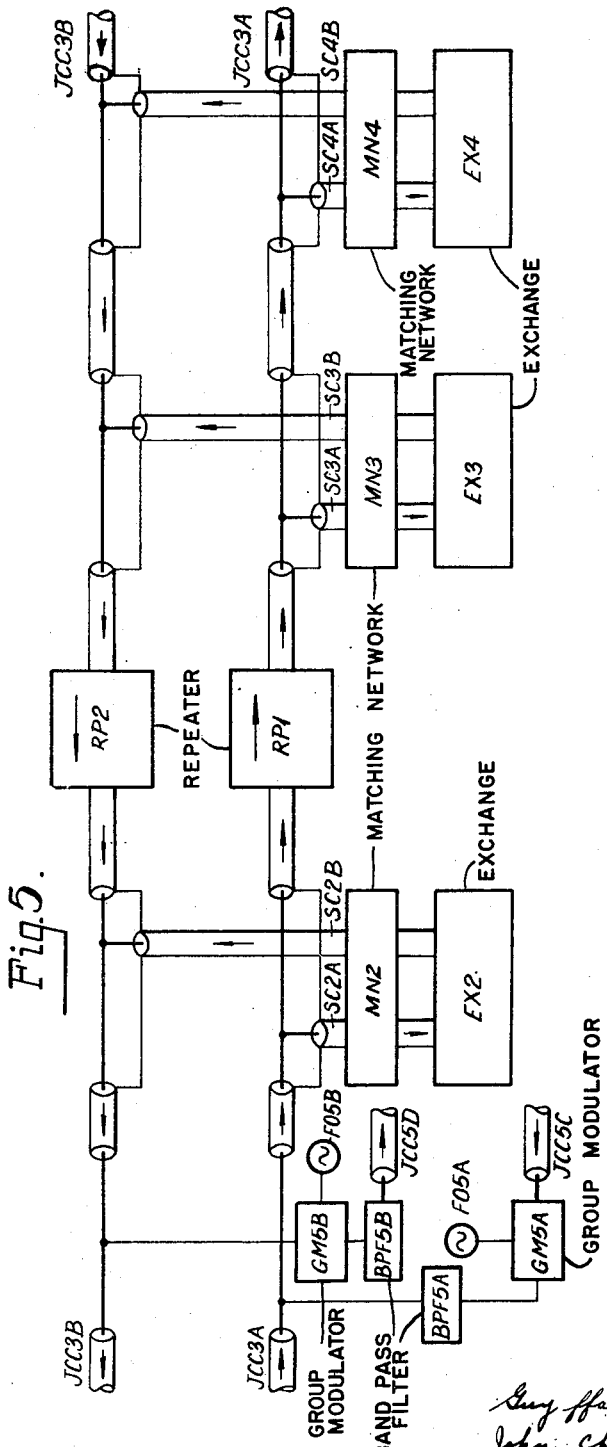

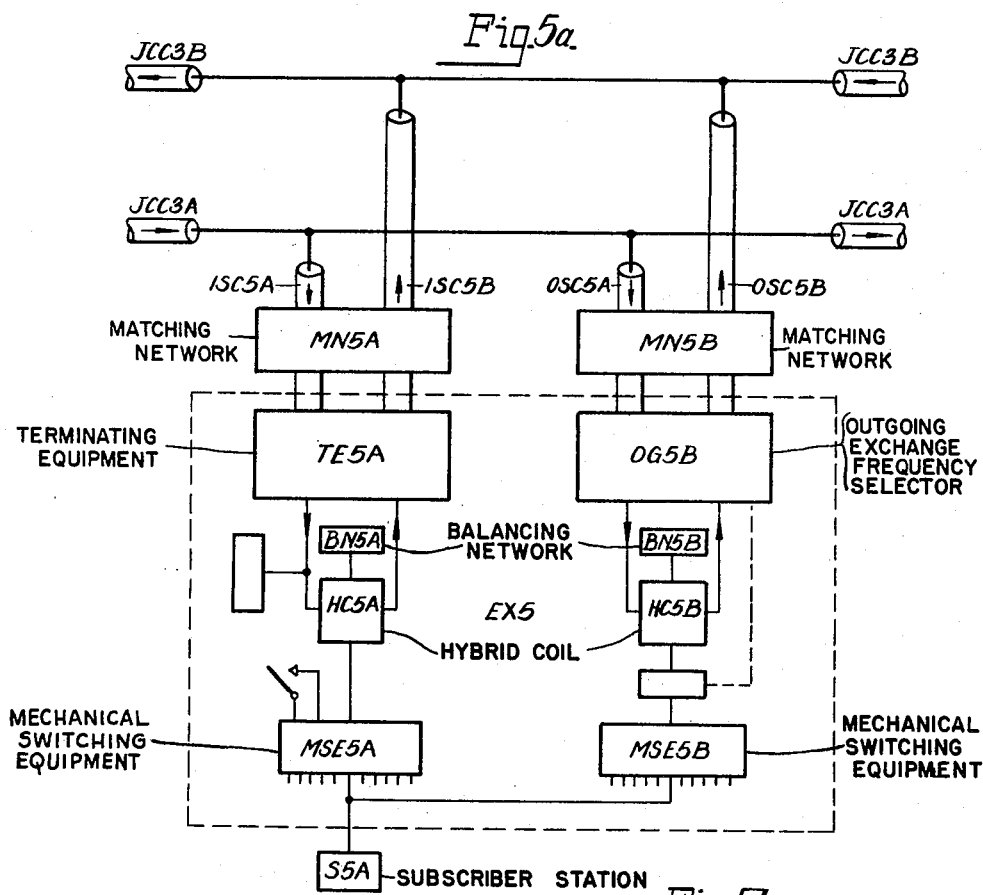
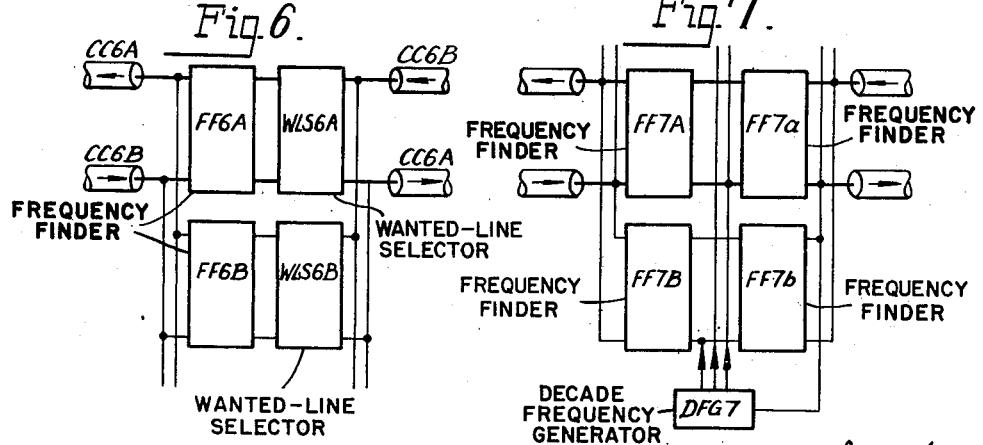

2,607,853

UNITED STATES PATENT OFFICE 2,607,853

TELECOMMUNICATION SYSTEM

Guy ffarington Bellairs, London, and John Charles Ireland, Tunbridge Wells, England, assignors to British Telecommunications Research Limited, Taplow, England, a British company Application January 24, 1948, Serial No. 4,143
In Great Britain January 27, 1947

13 Claims. (Cl. 179—15)

The present invention concerns improvements in or relating to systems for electrical communication and particularly to systems in which intelligence is transmitted by modulated carrier currents.

Various systems have been proposed for the exchange of intelligence by modulation of high frequency carrier currents over a common two-way wave conducting or guiding path or network such as a coaxial cable, a two wire or four wire circuit or in fact any multi-channel circuit, in which a number of stations provided with modulation and demodulation equipment, are connected to said path or network at positions spaced from each other along the path so that connection can be set up between any two such stations either directly or through a central station.

In such arrangements a carrier channel or channels is usually allocated to each of said stations for use in making connections.

In British Patent No. 455,279, the frequency allocated for initiating a call to the central station is different from the frequency or frequencies allocated to the same station when it is being called. At the central station means are provided for marking the contacts of a mechanical switch so as to distinguish the idle and busy condition of a frequency channel allocated to the various stations so as to enable connection to be made to calling lines when a call is initiated and to called lines when a station has been selected, busy signal transmitting means being provided at the central station for informing a calling station of the busy condition of stations which are being called.

With modern practices the cost of provision of long distance telephone services is becoming steadily reduced and the greater proportion of the overall cost of provision of a national telephone service is becoming centred on exchange apparatus, local junction circuits and local line distribution. Future steps in the continual endeavour to reduce tariffs and yet offer wider facilities must therefore largely be concerned with the reduction of the cost of this local equipment.

In the arrangement of the prior art above referred to, use is made of what may be described as a telephone main resembling in many respects the mains used for electric power, water and gas, in that instead of individual connections by pairs of wires between the individual subscribers in the exchange, it is possible to connect large numbers of subscribers to a common main and still retain a separate communication channel for each subscriber. For convenience in this specification, a guiding path or network which may consist of one or more coaxial cables or a number of cables adapted to deal with a plurality of carrier frequency channels, which guiding path or network is associated with more than two separated stations, will be called herein a "telephone main" to distinguish from a guiding path or network which interconnects two stations only.

An important object of the present invention is to extend the use of telephone mains so that interworking can take place between one telephone main and another or that a telephone main or mains may be employed between automatic exchange switching centres independently of whether the exchanges are working in conjunction with mechanical switching or with what might be termed frequency switching or electronic switching. The expression "frequency switching" as used herein is intended to apply to the operation of changing the carrier frequency so as to enable intelligence to be transmitted over different carrier frequency channels at different stages of a connection according to the connection which is being set up.

According to one feature of the invention connections are adapted to be set up under a control of a calling party between calling and called station over a plurality of telephone mains connected in tandem by modulation of high frequency currents characterising the connection which is being set up.

According to a further feature of the invention, a telephone or like system for the exchange of intelligence is provided in which connections are adapted to be established under control of a calling party over a telephone main linking more than two exchanges, intelligence being adapted to be transmitted by modulation of high frequency carrier currents over siad telephone main.

The invention is applicable to single exchanges to which a plurality of telephone mains are connected so that connections can be set up by frequency switching between subscribers connected between telephone mains and subscribers connected to other telephone mains as well as to subscribers on the same telephone main.

The invention is also applicable to telephone mains between exchanges all employing mechanical switching or all employing frequency switching or one or more employing mechanical switching and one or more exchanges employing frequency switching in which the selection of the carrier channel required for setting up a connection is effected by mechanical or frequency switching and the frequency channel selected leading towards the wanted exchange and to demodulating means thereat to enable a connection to be set up by mechanical or frequency switching and to enable speech to take place between the calling and wanted exchanges. Telephone mains may thus be adapted for use between existing exchanges without necessarily having recourse to frequency switching throughout the system.

Present automatic telephone systems working on the step-by-step principle involve the use of a multiplicity of switch contacts, bulky apparatus and extensive trunking between the various groups of switches with consequent heavy costs. By employing high frequency distribution and frequency switching in accordance with the invention, not only can these heavy costs be reduced but improved facilities provide for transmission and interconnection. The "Teed" connection of subscribers to a common distribution circuit or telephone main becomes possible and methods of interconnection at the exchange lead to the reduction of switch contacts to a minimum. Indeed the total elimination of such contacts from the speech path is possible. At the same time the trunking within the exchange is greatly simplified. The invention provides for the extension of this principle to junction working and to trunk exchanges in a manner which presents facilities not conveniently attainable by conventional methods.

It will be appreciated that the invention can be applied for other purposes than telephony whenever flexible interconnection of a number of stations or locations is required as in telegraph or other signalling systems.

These and other features of the invention will be better understood by referring to the accompanying drawings in which:

Figure 1 illustrates in diagrammatic form a subscriber's instrument circuit as connected to a telephone main consisting of two coaxial cables.

Figure 2 illustrates in diagrammatic form a carrier-frequency finder which hunts for a carrier frequency generated from a calling station.

Figure 4 illustrates a wanted line selector.

Figures 5 and 5A illustrate a telephone main linking a plurality of exchanges with repeatering arrangements.

Figure 6 illustrates in diagrammatic form the equipment according to the invention as applied for setting up a connection between subscribers on the same telephone main, it being known to set up such a connection by other means as in British Patent No. 455,279 above referred to.

Figure 7 illustrates an alternative to Figure 6 using frequency finding equipment only in the conversational route.

Figure 8 illustrates an arrangement by which access may be had to a number of telephone mains from a multiple wanted line selector, and the wanted line selector of Figures 2 and 3.

Figure 9 illustrates suitable carrier frequencies for giving maximum efficiency in use of coaxial cables as telephone mains.

Figure 10 illustrates suitable frequencies for the various values of the digits in a decade frequency generator.

Figure 3:
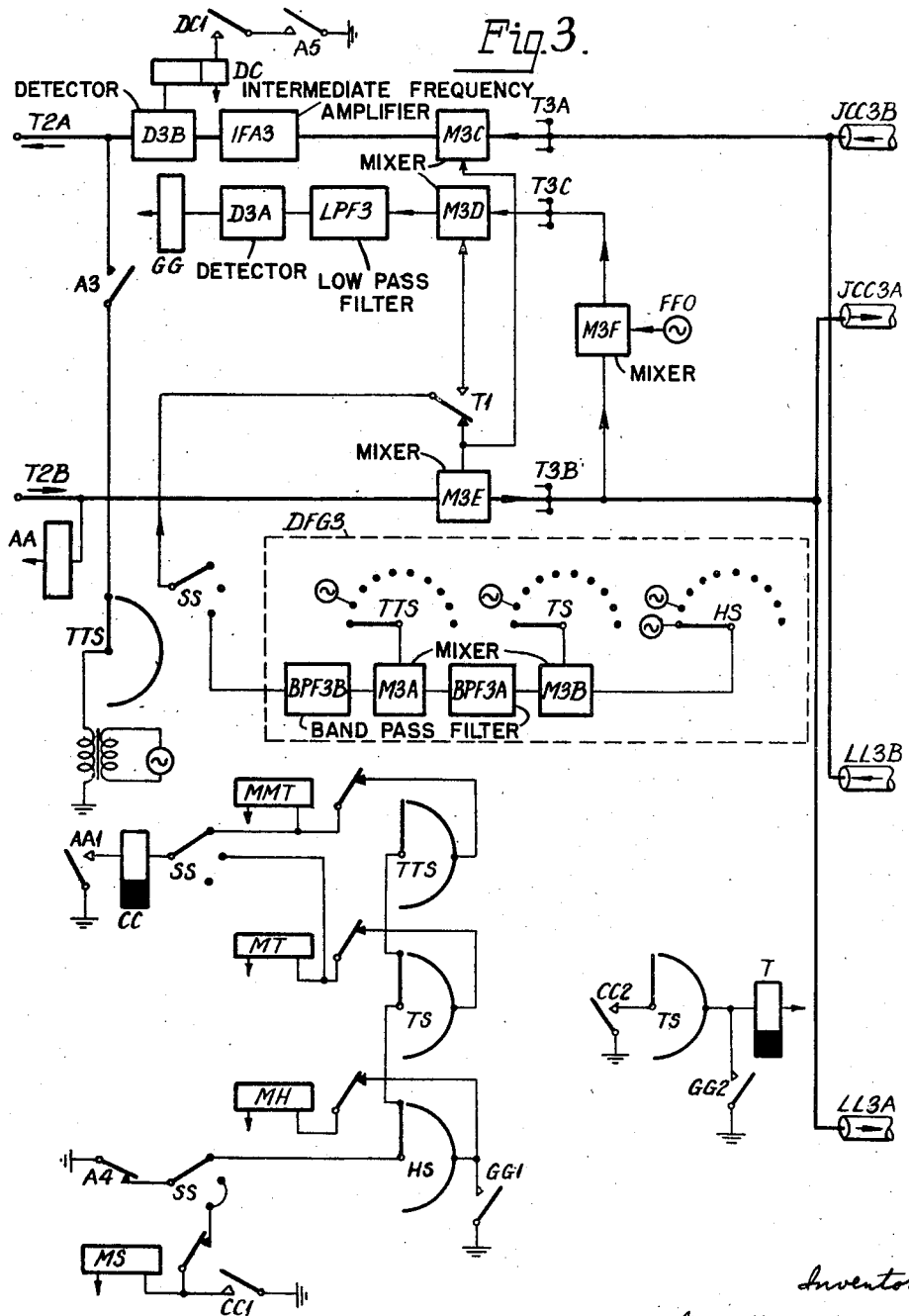
Figure 3 illustrates an exchange-frequency selector by means of which a particular carrier frequency having access to the wanted exchange or to an intermediate exchange may be selected or a wanted line selector individual to the calling exchange may be selected according as to whether an interexchange call is being set up or a local call.

Throughout this description it is assumed the transmission is effected by amplitude-modulated double-side-band methods. This enables the greater simplification of apparatus. The use of vestigial carrier single-side-band working would principally effect a saving in line plant but would result in considerable complications of both subscribers and exchange equipment. Similarly frequency modulation although possible within the scope of the invention appears to offer no advantages.

Throughout this description the selection of one desired frequency or channel from the number that may be simultaneously present at one point is effected by "superheterodyne" principles, i. e. by changing the frequency of the desired channel to a uniform intermediate frequency which may be selected by an intermediate frequency filter whose design may be uniform throughout the system.

This has been done for convenience in manufacture, but the invention is not limited thereto and selection by means of a plurality of band-pass filters alone or combined with frequency changing means may be employed if desired without departing from the invention.

Figures 1, 2, 3, 4, 5 and 5A represent a single connection and should be read together as shown in Figure 11.

A subscriber's telephone instrument as illustrated in Figure 1 is arranged to transmit and receive signals including speech at carrier frequencies. A number of such instruments of which only one is shown may then be connected to a telephone exchange over the common guiding path or telephone main represented by the coaxial cables CC1A and CC1B. Each individual subscriber is allocated a particular carrier frequency for transmission on one cable such as CC1B and a further distinctive carrier frequency for incoming signals over cable CC1A. Individual subscriber's stations are T connected by spur cables to the telephone main represented by CC1 and CC2 from the exchange in a manner analogous to the conventional distribution of electric power. It will be understood that the arrangement of two coaxial cables, one for "Go" channels and one for "Return" channels is only given by way of example, as "Go" and "Return" channels could be provided on a single cable using group modulation methods to segregate the directions of transmission. It will be assumed that 500 subscribers could be connected to each telephone main though it will be appreciated that this figure could be varied up or down as may be found convenient or as may be practicable. It may be necessary to employ repeaters if the telephone mains exceed a certain length in which case wide band repeaters will be provided each adapted to amplify "Go" and "Return" channels appropriately. By arranging that all signalling facilities from the subscriber's stations such as calling, clearing, impulsing are at carrier frequencies, amplification is possible and the signalling and transmission limits are therefore identical, and signalling and supervisory facilities may be provided on a more generous and reliable basis than is possible within the limitations set by an individual subscriber's loop circuit in any conventional system.

Each subscriber's instrument incorporates a number of thermionic valves for effecting modulation and demodulation of the carrier signals and the arrangement illustrated is purely diagrammatic as a more detailed circuit is illustrated in a copending application. In the light of recent technical developments the initial and maintenance cost of such equipment will not be heavy, and size and weight of the complete equipment it is considered, would not present any marked increase over present designs of apparatus. By using valves in subscribers' instruments, coupled with the provision of effectively separate paths for each direction of transmission, the subscriber is provided with a consistent standard of speech transmission which is at present generally unattainable.

In order to obtain power for the valves for each subscriber's instrument, use may be made of the telephone main itself to supply current from the exchange or any other convenient power path. Other sources of power can be provided if desired, while by employing a special type of subscriber's microphone so that direct current need no longer be drawn from the exchange and/or by using miniature valves the power consumption of the instrument as a whole can be kept to a reasonable figure.

Referring to the equipment of the subscriber's instrument CCO1 represents a crystal controlled oscillator which normally feeds the mixers or modulators M1A and M1B. LFA1 is an intermediate frequency amplifier and D1 is a detector. The arrangement is such that when the frequency allocated to the "Return" channel of the substation is received from cable CC1A such frequency cooperating with the frequency of CCO in the mixer M1A results in a frequency which will pass through IFA1. Modulation of the frequency received results in modulation of the intermediate frequency through IFA1 being detected by D and fed to either the loudspeaker or receiver LS or the bell B according to the position of the switch hook SW. LFA1 is a low frequency amplifier which is adapted to be fed with speech currents from the moving coil microphone MCM or to be caused to generate impulses under control of the dial switch DS, which speech currents or impulses serve to modulate the frequency generated by CCO1 by the aid of mixer M1B, the resultant modulated carrier wave being transmitted on cable CC1B.

The operation is briefly as follows:

When the subscriber lifts his receiver a potential is applied to cause the mixer M1B to become effective and cause a carrier frequency corresponding to the frequency of the oscillator to be transmitted over coaxial cable CC1B. This carrier frequency is in due course detected by a frequency finder at the exchange as described hereinafter, and a transmission connection set up to the impulse responding equipment. When this is done a dial tone is caused to modulate a carrier frequency removed from the frequency of the outgoing carrier by a fixed amount corresponding to the pass frequency of IFA1. When this modulated carrier is received by mixer M1A, oscillator CCO1 acts as first oscillator of a superheterodyne receiver comprising M1A, IFA1 and D1, the resulting intermediate frequency is amplified by IFA1 and passed to detector D1 which by demodulation causes the dial tone to be transmitted to the loudspeaker LS through the operated switch-hook contacts. The dial switch DS can now be operated to set up the required number either by interrupting the emitted carrier or by applying voice frequency tone impulses to modulate the carrier. The latter method is preferred and may be effected by causing the low frequency amplifier LFA1 to oscillate intermittently by back coupling the amplifier in accordance with the impulses to be dialled or in any other suitable manner. The invention is not limited to any particular method of transmitting the number required and push button selection of combinations of voice frequency currents may be used. The dialled impulses modulate by means of modulator M1B the carrier frequency on the cable CC1B and operates the impulse responding equipment in accordance with the destination of the caller. When the wanted subscriber replies the calling subscriber can speak by means of the moving coil microphone MCM and resultant currents sent over CC1B and can be heard on the loudspeaker receiver LS by currents received over CC1A.

In case the substation illustrated is called, a carrier frequency is applied to CC1A corresponding to frequency allocated to the "Return" channel for the particular substation which frequency is mixed by M1A and the output passes through IFA1 to D1 which in response triggers a gas discharge relay (not shown) to cause the bell B to ring. Alternatively the carrier frequency on CC1A may be modulated in accordance with the ringing current and the output of D1 used to control the bell.

When the subscriber answers he lifts the switch hook and thereby opens the bell circuit and connects up the loudspeaker LS. He can then speak as before. Outgoing speech currents modulate the carrier over CC1B and the received speech currents being mixed by M1A, detected by D1 and received by LS.

It will be understood that the precise method of effecting the various operations described may be considerably modified without departing from the spirit of the invention.

The power supply for the equipment may be provided locally or may be fed over the coaxial cables from the exchange preferably in the manner described in a copending application, in which a supply of alternating current for heating the valve cathodes and also for ringing the bell, is transmitted over one coaxial cable and direct current for high tension supply to the thermionic valves over the other coaxial cable. For a ringing signal all that is necessary is to derive from the modulation of the incoming carrier via detector D1 an audio-frequency voltage to break down a gas discharge tube and allow alternating current to reach the bell B1.

Other arrangements will be readily understood by those versed in the art.

A frequency finder which is one of a group, the number in which depends on traffic requirements is illustrated in Figure 2, the purpose of which is to intermodulate with continuously varying frequencies any frequencies present on the telephone main CC1A and CC1B to ascertain if any substation on the telephone main is in calling condition as determined by the presence of a carrier frequency corresponding to the frequency of a crystal controlled generator CCO1 of a substation being present on CC1B and the absence of a carrier frequency on CC1A corresponding to the frequency allocated to the same substation for the "Return" channel.

The frequency finder comprises essentially a superheterodyne receiver which serves to demodulate a calling subscriber's signals and a mixer or modulator for communication in the reverse direction. The receiver incorporates a variable frequency oscillator VFO2, a mixer M2A, an intermediate frequency amplifier IFA2 and a detector D2A. The frequency of the oscillator is determined by a control device CD which may comprise, for instance, a reactance valve or similar device which in turn is controlled by a sweep oscillator SO, such as saw-tooth oscillator which is adapted to generate a control voltage which causes the variable frequency oscillator VFO2 to generate frequencies varying over the whole of the range of frequencies allocated to calling substations on the telephone main CC1A. The frequency passed by IFA2 corresponds to the difference between the carrier frequencies of the "Go" and "Return" channels for each substation, such difference being the same for every substation connected to telephone main CC1A and CC1B. The output from the variable frequency oscillator VFO2 is fed to a mixer M2B through the back contact A2 of relay A to test point TP2 and also to a mixer M2A through the back contact B1 of relay B. A mixer M2C which is provided individual to the coaxial line CC1A and common to all frequency finders which may be required for the purpose of setting up simultaneous connections, is fed from a fixed oscillator FO2 with a frequency say 2,000 cycles per second so that all the frequencies present on coaxial line CC1A are modulated and pass with the sum and difference frequencies to terminal TP2 and thence to M2B. The consequence is that as the frequency of VFO2 approaches one of the modulated carrier frequencies present on TP2, the resultant difference product from M2C and M2B passes through low pass filter LPF2 to the detector D2B and tends to operate relay B. On the other hand as the frequency of oscillator VFO2 approaches that necessary to effect selection of a particular channel frequency on CC1B by mixer M2A and filter IFA2, the detection of the carrier of that channel by detector D2A causes operation of relay A.

If frequencies are present on both the coaxial lines CC1A and CC1B corresponding to a particular subscriber and indicating that such a subscriber is busy, then relay B will first, on account of the "fringing" action of the side bands receive sufficient current from D2B as to effect its operation. B on operation disconnects M2A and thereby prevents the operation of relay A when the frequency of the variable frequency oscillator subsequently approaches a value at which relay A would operate. On the other hand if there is no frequency present on CC1A corresponding to the frequency present on CC1B of a calling subscriber, then relay B will not be operated and consequently relay A will. In addition, the received signal passes to the discriminator DSC which so operates on the control device CD as to cause variable frequency oscillator VFO to be adjusted and arrested so that the intermediate frequency produced falls in the middle of the pass band of the filter characteristic of intermediate frequency amplifier IFA2. Consequently variable-frequency oscillator VFO ceases to traverse the frequency range and generates a constant frequency which is separated a fixed amount from the frequency on CC1B depending upon the pass band filter characteristic of the intermediate frequency amplifier IFA2.

Contact A1 of relay A, on the operation of relay A, disconnects the sweep oscillator SO while contact A2 disconnects VFO from the busy tone circuit and connects the oscillator to the transmitting modulator or mixer M2D thus placing a carrier of the frequency allocated to the calling substation for receiving purposes on line CC1A, and thereby prevent other frequency finders from connecting up with the calling substation, and preparing a transmission path in the reverse direction.

It will thus be appreciated that the calling substation is now in association with terminals T2A and T2B and that signals such as impulsing or speech passing from the calling side of the substation reached T2B in demodulated form, while signals such as speech, tones or ringing current connected to terminal T2A, are modulated by M2D so as to reach the receiving side of the calling substation as modulations of the carrier frequency as determined by the setting of VFO2.

It will be understood that although relays A and B have been illustrated and described as if they were of the usual electro-magnetic type, actually they can be replaced by electronic devices for instance those which operate to suppress the normal functions of various valves in the circuits by placing suitable potentials on auxiliary electrodes. It should be explained here that where electro-magnetic devices such as relays or switches are described herein, this has been done for simplicity in explanation for they may with advantage be replaced by electronic devices performing the equivalent functions such as are now well known in the art.. In fact electronic devices will be probably desirable for handling the high frequenccies involved.

Relay A which is responsive to the presence of carrier frequency on CC1B corresponding to that to which FVO2 is sent, is adapted to remain operated as long as the switch hook at the substation is raised and to release when the calling party hangs up. It therefore serves as a hold relay and can maintain equipment of Figures 2 and 3 in operated condition throughout a connection and allow them to restore to normal conditions when the calling subscriber hangs up.

Contact DC2 is controlled by a relay DA (Figure 4) responsive to the response of the called subscriber which relay is locked operated when once energised, over contact DA1 in dependence upon contact DA5 of relay A.

The switching and impulse responding equipment required of course varies in accordance with the nize of the exchange or network concerned, and in the present description an example is given of a five-digit network having a number of exchanges of up to 1000 line capacity. Connections can be set up between subscribers on the same or another telephone main linked to the same exchange, or can be connected over a telephone main to another exchange where they can again be set up to subscribers connected to telephone mains associated with that exchange. It will be assumed that two digits are required to determine the exchange required and three to determine the number required in the selected exchange. Consequently it is necessary to provide an exchange frequency selector such as illustrated in Figure 3, and then the call either passes over lines LL3A and LL3B local to the exchange which may conveniently be a solid cored coaxial cable, to a wanted line selector as illustrated in Figure 4, if a call is to a subscriber connected to a telephone main associated with a calling exchange, or to junction coaxial cables JCC3A and JCC3B leading to a wanted line selector at another exchange or exchanges. Only a single pair of junction cables are illustrated but as this is a telephone main, it can comprise any number of pairs of cables, individual pairs of cables having access to a single exchange, or to two or more exchanges according to the traffic requirements of such exchanges.

In the description that follows it will be assumed that the telephone main comprising the junction coaxial cables JCC3A and JCC3B will be employed to transmit to another exchange or exchanges on all carrier frequencies allocated to the telephone main except those frequencies which are allotted for local working. For instance, there may be ninety-nine groups each including ten carrier frequencies allocated for interexchange working and one group of ten carrier currents for local working. It may be desirable to use bandpass filters to exclude from such junction cables all frequencies which they are not required to transmit.

As described with relation to Figure 2, the output from detector D2A leads to terminal T2B and thence to relay AA which is controlled in any suitable way depending upon the form the impulses take (e. g. interruptions of carrier or modulations by tone frequency) as to respond intermittently as impulses are dialled.

As explained, relay A is energised to arrest the finder on the frequency of the calling substation and remains energised as long as carrier frequency is being fed to line from the calling substation. Relay A at contact A3 completes a connection through normal contact of switch TTS for dial tone to be connected to terminal T2A and thence by modulation by M2D to the receiving loudspeaker at the calling substations to advise the subscriber that he can dial. Relay A at contact A4 opens a homing circuit for the switches SS, TTS, TS, HS. The switches TTS, TS and HS form part of a decade frequency generator DFG3 as described in a copending application. The first two switches are set to positions corresponding to the first digits dialled, and switch HS is adapted to hunt for a "free outlet." The means by which this is achieved is given in the following description: When impulses are received, relay AA operates intermittently and completes at AA1 a circuit for relay CC and the magnet MTT through wiper of steering switch SS in normal position. CC operates and at CC1 completes the circuit for magnet MS of steering switch SS. MTT responds to the impulses and steps the wipers of the tens of thousands switch TTS in accordance with the first digit dialled. When the first series of impulses cease the wipers of TTS rest on a contact corresponding to the first digit and relay CC releases shortly after opening the circuit of MS at CC1 to cause the wipers of the steering switch SS to advance one step so that the impulsing circuit is now connected to the magnet MT of the thousands switch TS. The next series of impulses therefore operate MT and CC. MT advances the wipers of the switch TS to the position corresponding to the thousands digit and energized MS by contact CC1 as before. At the end of the second digit, MS releases and advances the switch SS to the third position so as to interrupt the impulsing circuit. To the contacts of switch TTS there are connected ten frequencies lying in arithmetical progression. Similar arrangements (using different frequencies) are made for switches TS and HS. The common difference of the frequencies on TTS is ten times that of those on TS and 100 times that of those on HS.

By intermodulating the frequencies selected by TS and HS and filtering out their sum product a wave is obtained whose frequency may have any of 100 equally spaced values depending on the positions of TS and HS, and by intermodulating this wave with the frequency selected by TTS and filtering out the sum product again an output wave is obtained whose frequency may have any of 1000 equally spaced values, depending upon the settings of the switches TTS, TS and HS in decade fashion.

Difference products may be employed instead of sum products if preferred.

When CC operated for the second digit, it completed at CC2 immediately the wipers TS had left the normal position a circuit for slow release relay T. Relay T on energising operated contact T1 so that when the wipers of the switch SS were stepped to the third position a circuit was completed from the mixer M3D over T1 front contact, contact and wiper of switch SS in third position to the output of the decade frequency generator thereby completing a test circuit. Consequently the busy test circuit only becomes effective when the relay CC de-energises at the end of the second digit.

The switch HS has a frequency connected to the normal contact which when mixed with the frequency from switch TS in M3B gives resultant frequencies of which the sum frequency passes through BPF3A to M3A where it mixes with the frequency from switch TTS and the difference (say) passes through BPF3B to the test circuit; this latter frequency is designed to correspond to the first of the selected group of carrier frequencies which lead to the wanted destination. To the second contact of the bank of HS wiped over by the left-hand wiper there is connected up a frequency such that the resultant frequency applied to the test circuit will be equal to the carrier frequency of the second of the selected group of carrier frequencies and so on, with the frequencies connected to the third and subsequent contacts of the same bank the frequencies applied to the test circuit will correspond to the third and subsequent carrier frequencies of the selected group.

It is assumed that there are ten carrier frequencies in a group corresponding to the capacity of the switch HS, but of course there may be a different number if desired, provided that the whole range of carrier frequencies is no greater than the difference between the frequencies selected by the switch TS on successive steps.

Terminals T3D are multipled and are connected to the cable JCC3A and lead LL3A respectively, over which the call is advanced to its destination. Terminals T3C are multipled and connected to the output of a common mixer M3F which is fed from an oscillator FFO with a fixed frequency say 500 cycles and is also connected to the terminals T3B so that if there is any carrier frequency present on the cables or lines with which these terminals are associated, then the frequency on terminals T3C will be the sum and difference of that carrier frequency and the fixed frequency. If therefore the first of the selected group of carrier frequencies is busy there will be an output from M3D corresponding to the fixed frequency which passing to detector D3A through the low pass filter LPF3 will cause the relay GG to operate. Relay GG at contact GG1 completes a circuit for magnet MH through its own interrupting contacts and a maintaining circuit for relay T at GG2. The switch HS will therefore step and advance the wipers until a carrier frequency is placed on the test circuit for which there is no corresponding frequency on the cable or line being tested.

If GG does not operate or after it has ceased to operate the circuit for relay T is opened and consequently this relay will release after a short interval and at contact T1 front contact transfers the frequency output of BPF3B from M3D to M3C and M3E rendering T3B busy with respect to the particular carrier frequency found and M3E effective to modulate audio frequency currents with the desired carrier frequency, while M3C is rendered effective to demodulate modulated carrier frequencies received over the selected channel.

If the digits recorded by TTS and TS correspond to a local call then the connection will have been extended over line LL3B and LL3A to a wanted line selector as illustrated in Figure 4, whereas if the digits correspond to a subscriber in a distant exchange then the connection will have been extended over JCC3A and JCC3B to a similar selector in one or other of the exchanges as illustrated in Figure 5. Obviously the local lines LL3B and LL3A will be designed to handle the high carrier frequencies and may in fact be coaxial cables local to the exchange.

A wanted line selector local to the exchange is illustrated in Figure 4 which comprises two elements, the receiving element which is a simplified form of the equipment required for frequency finding as described in Figure 2, and a digit accepting element which corresponds to Figure 3 except that it functions to establish connections direct to the subscribers instrument. Each wanted line selector in a group is designed to accept signals at one particular carrier frequency only, which is hereinafter described as its "acceptance frequency"; and to return a corresponding signal at a frequency which differs from its acceptance frequency by the constant intermediate frequency. The receiving element comprises mixers M4B associated with the line LL3B and M4A associated with the line LL3A. These mixers are so arranged that normally the fixed oscillator FO4 whose frequency differs for every selector in the group, is connected to M4A so that when an exchange selector such as illustrated in Figure 3 places a frequency onto LL3A corresponding to the acceptance frequency of the selector, there will be a resultant intermediate frequency which will be allowed to pass and be amplified by an intermediate frequency amplifier IF4A, will be detected by D4A and caused to operate a relay AB. The relay AB at AB1 connects FO4 to M4B to enable transmission to take place back over LL3B. The output of detector D4A leads to an impulse responding relay BA. A circuit is now prepared for the transmission of the hundred, tens and units digits dialed from a calling substation. These impulses are received by M3E (Figure 3) and serve to modulate the carrier frequency connected to M3E and transmitted over LL3A to the wanted line selector in Figure 4. Here M4A provides an output which will pass through IF4 and D4A to control relay BA. Relay BA responds to these impulses and at contact BA1 completes the circuit for relay BC and for the magnet MHD of the hundreds switch HDS. The wipers of switch HDS are accordingly stepped to a position corresponding to the digit dialled. On the termination of the dialling of the hundred digit, relay BC releases and as it had on operation prepared a circuit for the magnet MS4 of steering switch SS4, the magnet now releases and steps the wipers of SS4 to the second position. In this position the impulsing circuit is extended to magnet MTN of the tens switch TNS so that the impulses corresponding to the tens digit now serve to reoperate relay BC and to step the wipers TNS to a position corresponding to the tens digit. At the end of the tens digit relay BC again releases and the wipers of switch SS4 are stepped as before, this time to the third position. In this position a circuit is prepared for the magnet MU of the unit switch US and the impulses for the units digit serve to step the wipers of the switch US to a position corresponding to the units digit. At the end of the series of impulses relay BC releases, the magnet MS4 steps the wipers of switch SS to the fourth position. Contact BC2 completed a circuit for relay TA through the off normal contacts of switch US, when the wipers stepped off normal, while at contact BC3 a circuit is completed from BPF4B over off normal contacts of switch US to front contact TA1 of relay TA to M4F. The switches HDS, TNS and US form part of the decade frequency generator DFG4 and are adapted to connect up frequencies characteristic of the digits recorded, which frequencies are arranged to be mixed by M4D, BPF4A, M4C and BPF4B as described in connection with the decade frequency generator DFG3 of Figure 3, so that their component values may be readily deduced. Preferably they are the identical frequencies and conveniently come from the same source in the exchange, e. g. a master crystal oscillator.

M4D serves to mix the frequencies selected by the left-hand wipers of US and TNS so that the output includes the sum and difference of such frequencies. BPF4A serves to select either the sum or difference frequency, but not both, and pass it on to M4C. M4C is also fed by the left-hand wipers of the hundreds switch HDS with a frequency corresponding to the hundreds digit and therefore the output of M4C consists of the sum and difference of the frequencies incoming to M4C, of which one is selected by BPF4B and fed as described to M4F. The next operation will depend upon whether the channel selected represents a connection to an individual subscriber or represents the first channel of a number of channels in a common group, e. g. leading to a P. B. X line. In the former case, if the line is busy there will be a frequency on the coaxial cable CC4A corresponding to the frequency output of the decade frequency generator DFG4. The frequency on CC4A is modulated in M4H with 500 cycles so that there will be an output from M4F of 5000 cycles when the output of DFG4 is connected up by the back contact of TA1. This will pass through the low pass filter LPF4A to detector D4B and will effect the operation of the relay G. Relay G at contact G2 holds relay T operated and at contact G1 connects busy tone to the return path at M4B where it modulates the carrier frequency generated by FO4 and passes back for demodulation by M3C, IFA3, D3B of Figure 3. It is modulated by M2D of Figure 2, to the carrier frequency allotted to the calling substation for incoming signals to the calling substation where it is again mixed at M1A with the frequency of CCO1 and the output which passes through IFA1 to detector D1 is demodulated and passes through the operated switch hook contacts to receiver LS to advise caller that the required subscriber is engaged. At the same time relay G maintains the operation of relay TA to prevent this relay releasing. The calling subscriber now hangs up his receiver thereby releasing relay A which results at contact A4 in homing circuits being completed successively for the switches SS, HS, TS and TTS of Figure 3. The circuit of relay T is opened and all the apparatus in Figure 3 is restored to normal and is now in readiness for another call. The release of relay A also enables the variable oscillator VFO2 to come again under control of sweep oscillator SO and resume hunting for a calling frequency channel. The release of relay T removes carrier frequency from M3E with the result that relay AB in Figure 4 releases. Relay AB at AB1 completes successive homing circuits for SS4, US, TNS and HDS. The circuit of relay TA is opened and this relay and relay G release and all apparatus in Figure 4 is restored to normal in readiness for another call.

On the other hand, if a called substation is free, then there will be no carrier frequency corresponding to the wanted subscriber's line on CC4A and when relay BC releases it opens the circuit of relay TA which after a short interval falls back and connects output from BPF4B over its back contact TA1 to mixers M4E and M4G. The effect of a carrier frequency of a wanted station being connected to CC4A results not only in marking this frequency channel as engaged, but also in circuits being controlled at the substation as described with relation to Figure 1 for calling the wanted substation. This is effected by connecting to mixer M4G through contact DB3 a ringing frequency (which may be interrupted if desired in a characteristic ringing cycle) which, on demodulation in the wanted substation will cause the bell to ring. Ringing tone is connected at this time from the fourth contact and middle wiper of switch SS4 over back contacts TA2 and D1 of relays T and D respectively. When the subscriber answers, the carrier frequency characteristic of the wanted station from the local oscillator, similar to CCO1 (Figure 1), is connected to CC4B which is mixed by M4E and the resultant passed through and amplified by the intermediate frequency amplifier IF4B and detected by D4D. The presence of this intermediate frequency in D4D results in the operation of relay D which by means of DA and DB causes a momentary voice frequency signal combination to be sent back over the connection to operate relay DC (Figure 3) which is locked up over contacts DC1 and A5 over a separate winding independently of the called substation and in sole dependence upon the calling substation. Relay DC at DC2 (Figure 2) controls the charge assessing means whether by metering or by recording as described in a copending application. Speech from the called substation modulates the frequency of the crystal oscillator thereat which is mixed by M4E with the output supplied from BPF4B and the output which passes through IF4B is demodulated by D4D. This output is in turn modulated by means of M4B, the carrier frequency determined by FO4 and passes over lines LL3B and mixes at M3C with the frequency output from BPF3B. The output frequency passing through and amplified by IFA3 is detected by D3B and audio frequency again produced, which at M22 modulates the frequency assigned to the calling substation for incoming speech as supplied by VFO2. At the calling station audio frequency currents are again produced by M1A, intermediate amplifier IFA1, detector D1 and are fed to the receiver LS. Similarly, speech from the calling subscriber is modulated by M1B with the carrier frequency determined by CCO1, Figure 1, mixed at M2A with the the carrier frequency VFO2 and the output passing through IFA2 is converted to audio frequency by detector D2A. These audio frequency currents in turn mix at M3E with the frequency from BPF3B and pass over LL3A where they are mixed at M4A with the frequency FO4 and the resultant which passes through IF4A is again converted to audio-frequency by D4A. This audio-frequency output in turn modulates the frequency from BPF4B at M4G that is the carrier frequency assigned to the wanted station. At the wanted station the incoming carrier is mixed with the frequency of the local oscillator in a similar method to that described in connection with the receiving side of the substation of Figure 1.

When the connection is terminated the calling subscriber hangs up and releases the connection in the same way as previously described.

If on the other hand the called line in the first of a number of subscribers in a common group such as P. B. X subscribers, then there will be a marker frequency determined by MO1 connected to test terminal TT4A. A marker oscillator such as MO1, MO2 and MO3 is provided for each channel of carrier frequency allocated to a particular P. B. X except the last channel of the group. The frequency of each marker oscillator is conveniently removed by two kc. from the "Return" frequency of the channel it is to mark.

When the decade frequency generator represented by HDS, TNS and US and associated equipment is set to the frequency of the channel so connected, the mixer M4F will admit a beat of two kc. to pass through the band pass filter BPF4C to the detector D4C and will cause relay H to operate. If the channel is busy the relay G will also operate as previously described.

The combined operation of G and H at contacts G2 and H2 complete a stepping circuit of the magnet MU of the unit switch US which thereupon steps to the next contact and causes a frequency to be put out through BPF4B corresponding to the frequency of the second channel of the group. Relays G and H are therefore adapted to test as before. The second and subsequent channels of a group, except the last, are marked by MO2, MO3 with frequencies which are two kc. removed from the frequencies produced from BPF4B by the second and subsequent positions of the switch US for the position just described. Relay H serves to see if the last channel of a group is reached or not, and relay G to determine whether the channel tested is busy or not. If it is the last channel of the group there will be no frequency of a marker oscillator to cause relay H to operate and the operation or non-operation of relay G will result in the operations described in connection with the testing for free and idle condition of a single channel. Relay H at contact H1, prevents busy tone being given until the last line of the group is reached.

In place of a large number of marker oscillators the necessary marking frequency may be derived from a common frequency multiplier or a pulse generator, the frequency desired being selected by a crystal or other filter and thence fed to the busy test point TT4A.

Figures 5 and 5A illustrate how connection is made to various exchanges from junction cables JCC3B and JCC3A (Figure 3) and also illustrates the provision of suitable amplifying arrangements or repeaters for each way of working. The individual equipment for each of the exchanges in Figure 5 employing frequency selectors would be identical with that shown in Figure 4 as regards wanted line selectors, and as Figures 2 and 3 for junction hunting and local selection of wanted line selectors. The exchange illustrated in Figure 5A is assumed to be an exchange operating with mechanical switching and a description of the equipment required is given hereinafter.

Referring to the drawing, Ex2, Ex3 and Ex4 represent exchanges connected to the telephone main represented by cables JCC3B and JCC3A; MN2, MN3, MN4 represent matching networks between the exchange equipment and the junction cables and RP1 and RP2 represent repeaters, one for each way of working. The repeaters comprise wide band amplifiers capable of dealing with the full range of frequencies which is liable to be transmitted over cables JCC3A and JCC3B. Repeaters would be provided at intervals along the cable as may be found desirable. The cables joining the exchange equipment with JCC3A and JCC3B may deal either with incoming calls or outgoing calls or both as found convenient. Spur cables SC2A, SC2B; SC3A, SC3B; SC4A, SC4B, which may also be of the coaxial type, are provided for connecting the exchanges Ex2, Ex3, Ex4 to the cables JCC3B, JCC3A via matching networks MN2, MN3, MN4.

Figure 5A shows an extension of the junction cable to an exchange employing mechanical switches EX5. This shows both incoming "Go" and "Return" spur cables ISC5A and ISC5B and an outgoing "Go" and "Return" spur cable OSC5A and OSC5B separately for convenience although incoming and outgoing spurs could conveniently be combined. The incoming spur cables extend to a matching network MN5A and from these are extended to terminating equipment TE5A similar to that shown at the reception or left-hand side of Figure 4, for each incoming channel of communication, that is to say the equipment equivalent to M4B, FO4, M4A, IF4A, D4A, AB and BA the frequency of the oscillator FO4 being in each case appropriate to the respective channel. The impulsing relay B5A equivalent to BA is illustrated. Incoming and outgoing audio frequency speech pairs from TE5A are connected to a hybrid coil arrangement HC5A which has connection to a balancing network BN5A and a connection to the mechanical switching equipment MSE5A by which access is had to the wanted subscriber represented by S5A. The hybrid coil interconnects a four-wire circuit and a bi-directional two-wire circuit in a manner conventionally used in the telephone art. Relay B5A controls the impulsing into the mechanical switching equipment so that the operation of this equipment takes place in well known manner according to the particular system in use.

For outgoing calls the mechanical switching equipment MSE5B is taken into use by a calling subscriber and connects either directly or indirectly to a hybrid coil arrangement HC5B. The outgoing "Go" and "Return" circuits from the hybrid coil arrangement HC5B extend to equipment OG5B similar to that shown in Figure 3, a balancing network BN5B being provided in the usual manner so that when a connection is set up to HC5B the impulses dialled by the calling subscriber are caused by the impulse repeater IR5B to control the setting of the decade frequency generator in OG5B corresponding to DFG3 (Figure 3) and thereby to select and idle frequency channel allocated to the exchange required and to extend this frequency through the matching network MN5B to the outgoing spur cables OGC5A and OGC5B. The impulse repeater IR5B serves to feed battery to the calling subscriber.

It will be appreciated that in this way it is possible to eliminate at least one stage of exchange selection from the mechanical switching equipment in that it is replaced by a frequency selector and this is very convenient if eventually it is intended to convert a mechanical switching exchange to a frequency switching exchange. Alternatively one could have an individual outlet for each outgoing channel of communication with the appropriate carrier frequency created from a fixed frequency source somewhat similar to M3C, M3D and M3E, LPF3, D3A and GG of Figure 3, utilising relay GG to mark the test contacts of the mechanical exchange selector, but as this equipment would become largely superfluous if the complete conversion was eventually to be effected, this alternative is not considered desirable.

It will be appreciated that the invention is not limited in any way to the particular layout described, but the principles of the invention can be applied both to smaller and larger networks. For instance, Figure 6 illustrates the employment of the circuits described where only one telephone main comprising coaxial cables CC6A and CC6B is required to connect all subscribers, for instance, the equivalent of a 500 line exchange or less. In this case the exchange frequency selector can be eliminated and the impulse responding side of the equipment of Figure 4 connected direct to the equipment of Figure 2. Consequently the equipment is conveniently represented by frequency finder switch as FF6A, FF6B and wanted line selectors WLS6A, WLS6B.

Figure 7 shows an alternative for the wanted line selector according to which two frequency finders (FF7A, FF7a; FF7B, FF7b) such as illustrated in Figure 2, are connected back to back and the operation of the second frequency finder is set by hunting for a frequency determined by a decade frequency generator DFG7 which in turn is set by the dialled impulses. The decade frequency generator in this case is not required to supply a carrier frequency throughout the conversation as the carrier frequency for this purpose will be supplied by the variable oscillator of the second frequency finder (FF7a, FF7b) when it is arrested. Consequently the decade frequency generator may be used successively for setting up a plurality of independent connections and therefore the quantity of the apparatus required can be considerably reduced. The arrangement shown in Figure 7 is applicable like Figure 6 to an exchange having a single coaxial cable and having a capacity equivalent to that up to 500 lines, although it will be understood that the principle of substituting a frequency finder under control of a temporarily used decade frequency generator may be employed at any numerical stage in a connection.

If it is desired to cater for a network of up to 5000 substations, for instance, which can conveniently be dealt with from a single exchange, it will be necessary to provide say five different telephone mains, each consisting of a coaxial cable pair to deal with the traffic. In such a case in order to avoid using two stages of selectors as in Figures 3 and 4, it is possible to employ a multiple wanted line selector capable of dealing with the whole 5000 lines.

The arrangement employed might be similar to that illustrated in Figure 8, in which separate finders are provided for each coaxial cable pair capable of dealing with 1000 substations, for instance, FF8A serves coaxial cable pair CC8A1, CC8B1, FF8B serves coaxial pair CC8A2, CC8B2, FF8C serves CC8A3 and CC8B3 and so on. Each frequency finder, FF8A, FF8B, FF8C etc., is connected to a multiple wanted line selector (MWLS8A, MWLS8B, MWLS8C) giving access to all the coaxial cable pairs (CC8B1, CC8A1; CC8B2, CC8A2; CC8B3, CC8A3 and so on) and thereby to all the substations in the network. Each MWLS is provided with five independent output connections, one to each telephone main, only one of which is rendered effective at a time. In practice this would involve providing each wanted line selector with five of each of the modulators M4E, M4G, M4F illustrated in Figure 4. The output side of these five sets of modulators M4G would be permanently connected to the five outgoing telephone mains and the input sides of the five sets of modulators M4E and M4F would be permanently connected to the five incoming telephone mains and their busy test points respectively, but at the conclusion of the impulses only one of the five sets will be energised depending upon the impulses dialled, for instance, in accordance with the first digit. If the number of subscribers to an exchange is very large it would be impracticable and uneconomical to increase the number of outlets of a multiple wanted line selector to correspond and the process of selection must then be carried out in two stages similar to that in a conventional automatic exchange and substantially as illustrated in Figures 2, 3 and 4, except that the junction cables JCC3A and JCC3B would be eliminated and leads internal to the exchange substituted and the wanted line selector of Figure 4 might be adapted to employ two digits only instead of three, or the exchange frequency selector of Figure 3 might be adapted to employ one digit instead of two.

It will be appreciated that the wanted line selector employed in Figure 6 would receive signals at audio-frequency, whereas where there are two stages of switching it is essential that the second stage should incorporate in its input circuit a fixed stage of frequency thus accepting signals not at audio frequency but at an input carrier frequency characteristic of the particular wanted line selector chosen, thus separating the various conversations entering the second switching stage.

It may be noted that the large number of outlets of the wanted line selector enables a very large group to be used without the limitations of mechanical type switches as previously used. Thus it is quite practicable for a multiple wanted line selector to respond to two digits and to provide 50 outlets from each of these 100 levels. By a simple arrangement these 50 outlets may be tested for the busy condition five at a time thus greatly reducing the interval before the first free wanted line selector is located and seized.

It will be appreciated that a multiple wanted line selector may readily be arranged to replace a wanted line selector if this should be found desirable in any part of the network. It is also possible to use multiple exchange selectors if desired and by the use of multiple exchange selectors as well as multiple wanted line selectors, two ranks of selectors may be arranged to deal with a very large network of a size normally employing four or more ranks of selectors.

It will be appreciated that as all the connections between an exchange selector and a wanted line selector are arranged to carry a number of carrier channels of different frequencies it is possible as illustrated in Figure 3 to have any desired number of local connections and any desired number of connections over the junction cables so that with very large isolated exchanges the junction cables may be entirely eliminated. However, it is possible as illustrated in Figures 5 and 5A, for the junction cables to have access to any number of exchanges and of course there may be in large networks a plurality of junction cables or telephone mains required to deal with the traffic. The method of dealing with such cables will be readily appreciated from the description which has already been given by those versed in the art.

It will be noted that not only has all apparatus individual to the subscriber at the exchange been eliminated, but also it is not necessary to provide junction relay circuits or other terminating equipment provided that the telephone mains are repeatered at suitable intervals if they are sufficiently long so as to avoid any transmission or signalling limitations over the junctions. It will be also clear that the general principles may readily be applied to satellite working and tandem working by choosing equipment having the appropriate functions.

It will be noted that a single telephone main from an exchange such as that containing the equipment of Figures 2 and 3 may be "Teed" into a number of other exchanges such as Ex2, Ex3, Ex4 of Figure 5 and Ex5 of Figure 5A, suitable ranges of frequencies out of the whole range with which the telephone main deals being apportioned between these exchanges in any way desired.

As an extension of this it may be noted that a number of subsidiary exchanges connected to a telephone main may in effect be allowed to share common junction groups to larger exchanges connected to the same main, in this case a call from one such subsidiary exchange will seize the first free channel of the common group, busy condition being exhibited simultaneously at all exchanges having access to the group. This facility might prove of important value for serving lightly loaded exchanges or in schemes for the decentralised control of trunk traffic whereby common access to economically large groups of trunk circuits would be offered to a number of decentralised call collecting control points. This facility is not available in conventional junction working unless a third wire is provided.

As defined above, the expression "telephone mains" broadly covers all forms of a guiding path for the transmission of carrier frequency currents linking a plurality of stations more than two. The most satisfactory form for the invention is a telephone main consisting of two coaxial cables. Each main may be subdivided or branched to cover a geographical area. If the main is individual to an exchange the substations may be connected to the main by short spur cables at convenient points. Similarly if the main serves the purpose of interconnecting three or more exchanges, each exchange may be connected to the main by similar short spur cables or a cable may actually enter each exchange. Possibly solid dielectric cables to which T connections might be made by means of a suitable tool would be preferable for the spur cables while the telephone main itself would preferably be an air spaced coaxial cable to which the spur cables would be connected through suitable impedance matching networks, that is to say, generally similar to the arrangement illustrated in Figure 5 except that in certain cases the exchanges are replaced by substations.

Distribution schemes for large exchanges may include cables including eight or more pairs of tubes within one sheath. Such a cable serving some 4000 subscribers would materially reduce duct congestion in the neighbourhood of large exchanges. By the insertion of wide band repeaters at appropriate intervals (say three to four miles) telephone mains may be extended to any desired length without impairing either transmission or signalling. It will thus be appreciated that no technical limitation therefore exists to the length of an exchange line, which is a serious limitation in the present automatic telephone systems. Such repeaters require a power handling capacity related to the maximum traffic on a telephone main at any particular time, but not to the ultimate number of subscribers connected thereto. The advantage of a telephone main when laid between three or more telephone exchanges is that it may be possible to eliminate, in certain cases, the requirement of providing tandem working. The use of telephone mains for distribution to substations and for junction routes provides a flexibility impossible with individual paired cables and greatly simplifies schemes for local line development.

Generally speaking it is desirable to give to the exchange selectors and wanted line selectors the availability of 1000 channels since this fits in best with the decimal system of numbering. Assuming a channel spacing of 8 kc. the total frequency range covered will be some 8 megacycles. While there is no objection to the use of such a frequency range within the exchange itself it is probably uneconomic to attempt to transmit 1000 channels over one telephone main since the frequency range and the total amount of power to be handled would render the design of the repeaters difficult. In such a case it is suggested that two or even four telephone mains carrying say 500 to 250 channels each should be "composited" on entering the exchange to produce an effective single 1000 channel main. Such "compositing" would be readily effected by employing group modulating and demodulating equipment to shift the entire frequency range of individual mains to different allocations in the equivalent 1000 channel main as described below. The frequency finders may be arranged to scan the entire range of 1000 channels or the range of one telephone main only.

At the left-hand of Figure 5 a simple arrangement for "compositing" the carrier frequencies of two pairs of coaxial cables is illustrated.

It has been assumed that 1000 outlets are accessible from the exchange selector of Figure 3. In practice this would be too many to be dealt with by a single pair of coaxial cables. The employment of group modulators GM5A and GM5B which are fed from fixed oscillators FO5A and FO5B serve to ensure, firstly, that the carrier frequencies of the requisite range which are transmitted towards JCC5D through the wide pass band filter BPF5B by mixing with the frequency of FO5B are lowered in frequency for passage through JCC5D. Secondly, carrier frequencies received over JCC5C are mixed by GM5A with a group frequency of FO5A and the sum frequency passed through BPF5A to the terminals of the exchange selector so that by thus "compositing" 500 channels from JCC3A and JCC3B and 500 channels from JCC5C and JCC5D, the full range of 1000 channels is obtained.

It will be readily appreciated that such an arrangement can be extended to apply to three, four or more pairs of cables as may be found desirable.

In view of the receivers used in the frequency finder equipment being of the superheterodyne type, it is desirable to prevent the acceptance of "image" signals and this may be attained by arranging that the intermediate frequency should not be less than half the total band width of the system. The working frequency may then be so arranged that all "image" frequencies lie outside the working frequency bands to which the receivers are responsive. In order to facilitate repeater design it is also desirable that the ratio of maximum to minimum frequency to enter one telephone main should not exceed two or three.

A typical frequency allocation is shown in Figure 9a the subscribers transmitting (or "Go") frequencies for 500 channels spaced eight kc. apart are allocated between four and eight megacycles, the corresponding exchange calling (or "Return") frequencies being allocated between six and ten megacycles. The intermediate frequency in this case is two megacycles. A smaller group of 500 channels may then be group modulated as previously described to the ranges 12 to 16 and 10 to 14 megacycles and then combined to give a joint frequency allocation for 1000 channels as illustrated in Figure 9b. It will be noted that the frequency of the frequency finder oscillator and the decade frequency generator is now required to be variable from six to fourteen megacycles.

The use of an intermediate frequency as high as two megacycles may be avoided by the split allocation shown in Figure 9c, where the subscribers "Go" frequencies lie between three to five and seven to nine megacycles while the calling or "Return" frequencies lie in the range four to eight and the intermediate frequency is therefore now one megacycle. Such telephone mains may be "composited" as before, to give the arrangement illustrated in Figure 9d for 1000 channels. In this case the decade frequency generator has to cover the discontinuous range of four to eight and ten to fourteen megacycles. This presents no difficulties, but the design of a frequency finder to deal with the same broken range of frequencies may make it desirable, if this type of allocation is employed, to arrange for each frequency finder to scan five hundred channels only, exploring the range of four to eight megacycles.

The choice of frequencies for the decade frequency generator requires to take into consideration the provision of simple filters which will readily eliminate all unwanted modulations produced. The frequency allocation table illustrated in Figure 10 shows how as an example, a decade frequency generator may be made to provide approximately the frequency bands shown in Figure 9b. The frequency shown is in kilocycles/second.

Referring to Figure 4, with this allocation of frequency filter BPF4A is arranged to pass frequencies from about 16,750 to about 19,000 kc. only, it will therefore transmit only the "sum" product of mixer M4A whose output may vary between 17,160 and 17,950 kc. Filter BPF4B is arranged to pass all frequencies below about 15,500 kc. and thus will transmit only the difference product of mixer M4B. This product which is the output of the generator, is variable from 6,048 megacycles to 14,040 megacycles in 1000 steps of eight kc., corresponding to the 1000 numbers from 111 to 000.

It will be appreciated that the elimination of higher order modulation products facilitates the use of gas discharge switching in the way referred to previously.

We claim:

1. A carrier-frequency group-selector comprising an incoming line having "go" and "return" paths, modulating means associated with the "go" path of said incoming line, demodulating means associated with the "return" path of said incoming line, a transmission medium for a plurality of carrier-frequency channels, such channels having separate "go" and return paths, said transmission medium being connected to said modulating and demodulating means, testing means including a demodulator for connection to the transmission medium, impulse responding means connected to the "go" path of said incoming line, frequency generating means controlled by said impulse responding means to cause the generation of a first carrier current having a frequency corresponding to the numerical significance of the impulses to which said impulse responding means responds, means for feeding said first carrier current to the demodulator of the testing means to ascertain if the channel of communication of said transmission medium corresponding to said first carrier current is busy, means controlled by said testing means and said frequency generating means if said channel is found to be busy to cause the generation of a second carrier current having a different frequency from that first selected which however is also distinctive of the numerical significance of the impulses received by said impulse responding means and to substitute said second carrier current for said first carrier current in said feeding means causing said testing means to make a test of a second channel of communication of the transmission medium and means controlled by said testing means when a free channel of communication is found of connecting that selected source of carrier current which corresponds to the carrier frequency of the free channel to the modulating and demodulating means associated respectively with the "go" and return paths of said incoming line to establish a communication means between said incoming path and the selected channel of said transmission medium.

2. A carrier-frequency group-selector as claimed in claim 1 in which the transmission medium comprises two coaxial cables, one for "go" channels and one for return channels.

3. A telecommunication system comprising a wide band transmission medium, a plurality of exchanges more than two which are linked by said medium, a calling station connected to one of said exchanges, a calling device at said calling station for controlling the setting up of a connection, a called station connected to another of said exchanges, a carrier frequency group selector including frequency testing means and a demodulator associated therewith which in response to control from the calling device in accordance with the designation of said other exchange hunts to find an idle channel of communication on said transmission medium, modulating means operated under further control of signals sent by said calling line in accordance with the remaining part of the designation of the called line to cause said signals to modulate the carrier wave of the selected channel and switching devices at said exchange responsive to the modulated signals to extend a connection to the called station.

4. A telecommunication system as claimed in claim 3 in which the exchanges linked by said transmission medium consist of a central exchange and satellite exchanges.

5. A telecommunication system as claimed in claim 3 in which one of said exchanges is an exchange in which connections are set up by modulating high frequency currents in accordance with the destination of the call and another of said exchanges is an exchange in which connections are set up by mechanical switching means.

6. A telecommunication system as claimed in claim 3 in which the transmission medium consists of two coaxial cables one for transmission in each direction.

7. A telecommunication system comprising in combination a calling station, a called station, a wide band transmission medium comprising a pair of coaxial cables for extending a connection from said calling to said called station, a carrier frequency group selector for setting up a connection under control of said calling station to said transmission medium including a modulator and demodulator for "go" and return paths, testing means including a demodulator and means controlled by signals transmitted from said calling station to determine the frequencies of carrier currents to be applied successively to said testing demodulator until an available channel of communication on said transmission medium is found and thereafter apply carrier frequency current corresponding to said selected channel to said modulator and demodulator from the "go" and return paths to enable further signals transmitted from said calling station to modulate said selected carrier current, means accessible to said transmission medium and responsive to such signal modulated carrier waves transmitted thereover to extend the connection to a called station and means operable when the called station replies for transmitting carrier currents in both directions over said transmission medium which carrier currents are modulated and demodulated by said modulator and demodulator for the "go" and return paths respectively.

8. A telecommunication system as claimed in claim 7 in which one of the pair of coaxial cables is used for one direction of transmission and the other one of the pair for transmission in the opposite direction.

9. A telecommunication system comprising in combination a plurality of calling stations, a plurality of called stations, a plurality of wide band transmission mediums each comprising a pair of coaxial cables, a carrier frequency group selector comprising testing means and a demodulator for hunting for an available channel of communication on said transmission mediums and means for determining the frequencies with which the signalling circuits for calling stations are to be modulated and the transmission mediums over which the connection is to be set up and group modulating means at the called end of said transmission mediums by which the selected frequencies are arranged to be shifted so as to occupy frequency ranges distinctive of both the frequency and the medium selected in a band of frequencies wider than the band for any one transmission medium.

10. A telecommunication system comprising in combination a transmission path having associated therewith modulating means by which a group of communication channels may be established thereover, each communication channel having a carrier wave for the calling direction of communication and a second carrier wave separated from said first carrier wave by a fixed amount for the called direction of communication, a second transmission path also having associated therewith modulating means by which a group of communication channels may be established thereover, each communication channel having a carrier wave for the calling direction of communication and a second carrier wave separated from said first carrier wave by a fixed amount for the called direction of communication, carrier frequency group selectors including frequency testing equipment with demodulators for interconnecting a channel of the first group with an available channel of either group comprising modulated means by which the calling carrier wave is mixed with a wave of suitable frequency to give a resultant wave lying within a standard frequency band and further modulating means by which said resultant wave is mixed with a wave of such frequency as to give a resultant wave of a frequency corresponding to the carrier wave frequency of the called direction of communication of the wanted communication channel.

11. A telecommunication system as claimed in claim 10 in which the wave within the standard frequency band is at audio frequency.

12. A carrier-frequency group selector associated with a transmission path and comprising selecting means, an oscillator adapted to generate one of a number of waves of different frequencies as determined by said selecting means, testing means including a demodulator by which said generated wave is caused to cooperate with waves on said transmission path and responding means which operate if a wave of a frequency corresponding to that determined by said selecting means is already present on the transmission path to cause said oscillator to generate successively waves having frequencies related to the frequency first determined until a wave is generated having a frequency for which there is no counterpart on the transmission path.

13. A frequency-selector associated with a transmission path to which a number of called stations are connected and comprising selecting means, an oscillator adapted to generate, as determined by said selecting means, one of a number of waves of different frequencies each characterizing a called station, testing means including a demodulator and responding means which operate according as to whether a current having a frequency characterizing the station called is detected by said testing means on said transmission path or not, a number of communication channels on said transmission path being allocated to a single called station, the responding means operable when said called station is called to control the oscillator to cause it to generate successively waves having frequencies corresponding to the communication channels allocated to said station until an idle communication channel to said called station is found or if all is busy to give a busy signal.

GUY FFARINGTON BELLAIRS.
JOHN CHARLES IRELAND.

REFERENCES CITED

The following references are of record in the file of this patent:

UNITED STATES PATENTS

| Number | Name | Date |
|---|---|---|
| 1,568,194 | Smythe | Jan. 5, 1926 |
| 2,064,907 | Green | Dec. 22, 1936 |
| 2,084,903 | Frink | June 22, 1937 |
| 2,107,168 | Tidd | Feb. 1, 1938 |
| 2,114,718 | Levy | Apr. 19, 1938 |
| 2,137,023 | Monk | Nov. 15, 1938 |
| 2,143,563 | Levy | Jan. 10, 1939 |
| 2,202,474 | Vroom | May 28, 1940 |
| 2,270,385 | Skillman | Jan. 20, 1942 |
| 2,298,409 | Peterson | Oct. 13, 1942 |
| 2,324,394 | Holden | July 13, 1943 |
| 2,337,878 | Espenschied | Dec. 28, 1943 |
| 2,345,048 | Hubbard et al. | Mar. 28, 1944 |
| 2,387,018 | Hartley | Oct. 16, 1945 |
| 2,408,085 | Meacham | Sept. 24, 1946 |
| 2,408,462 | Wise | Oct. 1, 1946 |
| 2,409,063 | Ostline | Oct. 8, 1946 |
| 2,440,239 | Almquist | Apr. 27, 1948 |